United States Patent [19]
Mori et al.

[11] Patent Number: 6,106,879
[45] Date of Patent: Aug. 22, 2000

[54] FRIED FOOD AND SHORTENING

[75] Inventors: Hideki Mori; Hideaki Sakai; Yukitaka Tanaka; Takuji Yasukawa, all of Ibaraki, Japan

[73] Assignee: Kao Corporation, Tokyo, Japan

[21] Appl. No.: 09/069,759

[22] Filed: Apr. 30, 1998

[51] Int. Cl.[7] .................................................. A23D 9/007
[52] U.S. Cl. ..................... 426/438; 426/601; 426/606; 426/611
[58] Field of Search ................................. 426/438, 601, 426/611, 606

[56] References Cited

U.S. PATENT DOCUMENTS

| | | | |
|---|---|---|---|
| 3,914,452 | 10/1975 | Norris | 426/549 |
| 3,943,259 | 3/1976 | Norris | 426/612 |
| 4,335,157 | 6/1982 | Varvil | 426/606 |
| 4,976,984 | 12/1990 | Yasukawa et al. | |
| 5,262,185 | 11/1993 | Babka | 426/438 |
| 5,366,749 | 11/1994 | Frazee | 426/438 |
| 5,514,405 | 5/1996 | Yokonuchi | 426/438 |
| 5,695,802 | 12/1997 | Van Den Ouweland | 426/613 |
| 5,879,735 | 3/1999 | Cain | 426/603 |
| 5,912,042 | 6/1999 | Cain | 426/607 |

FOREIGN PATENT DOCUMENTS

| | | |
|---|---|---|
| 0 307 154 | 3/1989 | European Pat. Off. . |
| 0 378 893 | 7/1990 | European Pat. Off. . |
| 0 525 915 | 2/1993 | European Pat. Off. . |
| 0 679 712 | 11/1995 | European Pat. Off. . |
| 0 836 805 | 4/1998 | European Pat. Off. . |
| 4-300826 | 10/1992 | Japan . |
| 8-173035 | 7/1996 | Japan . |
| 8-173036 | 7/1996 | Japan . |
| WO 95/22256 | 8/1995 | WIPO . |

*Primary Examiner*—Carolyn Paden
*Attorney, Agent, or Firm*—Oblon, Spivak, McClelland, Maier & Neustadt, P.C.

[57] ABSTRACT

A fat composition is provided containing 55 to less than 95% by weight of diglycerides, in which 55 to less than 93% by weight of the fatty acid groups present are unsaturated fatty acid groups, and a shortening composition containing the fat composition, as well as fried foods containing the fat composition, wherein the shortening is reduced in bubbling during deep frying, and the fried food gives a satisfactory feeling in the mouth and improved crispiness.

16 Claims, No Drawings

FRIED FOOD AND SHORTENING

BACKGROUND OF THE INVENTION

1. Field of the Invention

The present invention relates to a shortening oil which contains diglycerides in a high concentration and a food fried with the shortening oil.

2. Discussion of the Background

It is becoming clear that diglycerides have a function of being less likely to become body fat (See JP-A 4-300826). In order to ingest diglycerides in an effective amount through daily foods processed with fats, it is necessary to produce a fat-processed food containing diglycerides in a high concentration.

On the other hand, the fats used in conventional shortenings for frying are non-blended fats such as soybean oil, rapeseed oil, corn oil, palm oil, coconut oil, and lard and fractions obtained from natural fats in order to be suitable for individual applications. However, fats having a high degree of unsaturation have poor storage stability and thus pose a problem that snack cakes produced with the fats develop an odor of deteriorated fats. Although fats based on palm oil or hydrogenated oils have frequently been used in order to prevent fat deterioration during storage, these fats have the problem that the fats based on palm oil taste too light and are poor in flavor, while the hydrogenated oils tend to emit an odor changed by hydrogenation upon heating.

In the production of friedcakes such as potato chips, the deep frying process reduces the water contained in starch for a short time to thereby cause the fried product to be crispy. However, such friedcakes have a problem that even slight moisture absorption reduces the crispness and considerably impairs the flavor. French fried potatoes and fried chicken also can be made to exhibit crispness by reducing the water content of the surface layer of the coating in the deep frying process. However, when the coating surface layer absorbs moisture even slightly, these fried foods also have reduced crispness and impaired flavor.

Furthermore, deep-fried foods such as friedcakes, french fried potatoes, fried chicken, and doughnuts often give off or ooze oil, giving not only poor appearance but losing crispness in the mouth, and being sticky.

U.S. Pat. No. 4,976,984 and EP-A 525,915 disclose edible fats containing phospholipids and diglycerides. However, there is no description therein concerning the deep frying process using an edible fat containing diglycerides in a high concentration. Moreover, shortening containing phospholipids has a problem that it discolors upon heating.

SUMMARY OF THE INVENTION

Accordingly one object of the present invention is to provide a shortening or a shortening oil which contains diglycerides in a high concentration that is effective in reducing bubbling during deep frying.

A further object of the present invention is to provide fried foods, especially friedcakes, prepared using the shortening of the present invention, that have low water content and are not likely to get wet over long periods of time, giving a satisfactory feeling in the mouth.

A further object of the present invention is to provide fried potatoes and fried chicken prepared using the present shortening, which are crisp and are not likely to be reduced in crispness over long time periods.

A further object of the present invention is to provide a shortening that gives reduced oil absorption in deep frying during doughnut production.

A further object of the present invention is to provide a shortening that gives reduced oil oozing and reduced greasiness, as well as improved crispness in foods produced by deep frying in the shortening, such as friedcakes, french fried potatoes, fried chicken and doughnuts.

These and other objects of the present invention have been satisfied by the discovery of a fat composition comprising:

a monoglyceride content of 2% by weight or lower, a diglyceride content of 55 to less than 95% by weight, and a triglyceride content of 5 to less than 45% by weight, wherein
(1) from 55% by weight to less than 80% by weight of the fatty acid groups contained in the diglycerides are unsaturated fatty acid groups,
(2) the diglycerides comprise 0.5% by weight to less than 20% by weight of SS components, 20% by weight to less than 55% by weight of SU components, and 25% by weight to less than 70% by weight of UU components, wherein S represents a $C_{14-22}$ saturated fatty acid group and U represents a $C_{14-22}$ unsaturated fatty acid group, wherein the total of % SS+% SU+% UU=100, and
(3) a weight ratio of $C_{14}$ and $C_{16}$ saturated fatty acid groups contained in the diglycerides to $C_{18}$, $C_{20}$, and $C_{22}$ saturated fatty acid groups contained in the diglycerides is 1.0 to 8.0, and its use in preparing a shortening for frying, as well as fried foods prepared with the oil composition.

DETAILED DESCRIPTION OF THE PREFERRED EMBODIMENTS

The present invention provides a oil or shortening composition comprising from 55% by weight to less than 95% by weight of diglycerides, in which 55% by weight to less than 93% by weight of the fatty acids are unsaturated fatty acids, and a food fried with the shortening composition.

In addition the present invention provides food fried with an oil composition comprising 55 to 95% by weight of diglycerides, wherein 55 to less than 93% by weight of the fatty acids of which are composed of unsaturated fatty acid groups. The fried food may include, for example, fried cookies, fried potato chips, fabricated potato chips, fried snack food, fried confectionary of rice, wheat, corn, potato, sweet potato, fried chicken and fried doughnuts.

It is preferable that the fried food further comprises 2% by weight or less of monoglycerides and 5 to 45% by weight of triglycerides, wherein the diglycerides comprise 2 to 20% by weight of SS, 20–55% by weight of SU, 25–70% by weight of UU, wherein S represents C14–22 saturated fatty acid group and U represents C14–22 unsaturated fatty acid groups and the total of % SS+% SU+% UU=100. The diglycerides also have a weight ratio of the saturated fatty acid groups having C14 and C16 to the saturated fatty acid groups having C18, C20 and C22 of from 1.0 to 8.0.

The present invention also provides a method for using the oil composition as defined above as a substitute for a frying shortening or oil in cooking and frying foods; a method for improving the taste, flavor, appearance and/or feeling in the mouth of a fried food by frying it with the present oil composition and; a method for keeping a fried food dry by frying it with the present oil composition to get crispy.

The term "friedcake" as used herein means a cake obtained by deep-frying a composition (preferably of dough) comprising starch as the main ingredient. Examples thereof include potato snacks such as potato chips, fabricated potatoes, and shoestring potatoes, flour-based snacks, corn-based snacks, rice-based snacks, snacks based on sweet potato, rice cakes such as fried rice crackers, and fried dough cakes.

The term "french fried potatoes" means a food obtained by deep-frying strips of a white potato. A seasoning such as common salt may be added before or after deep frying.

The term "fried chicken" means a food obtained by covering feedstock chicken with a coating powder comprising starch as the main ingredient, such as flour or potato starch, and deep-frying the covered chicken. Any part of a chicken can be used, including, but not limited to thighs, breasts, and wings. The chicken may be immersed in a liquid seasoning before deep frying.

The term "doughnut" means a food obtained by shaping dough obtained by mixing flour, sugar, egg, a dairy product, a flavor, etc. into a disk, ellipse, or annular form and deep-frying the shaped dough. Examples thereof include cake doughnuts, soft doughnuts, yeast-leavened doughnuts, and fried danish pastries, and further include fried breads stuffed with a cooked filling, such as curry-stuffed fried bread and piroshki.

The feedstock fat or oil for use in the present invention shortening is not limited in its source. Vegetable, animal, and other fats and oils may be used as the feedstock. Examples thereof include rapeseed oil, sunflower oil, corn oil, soybean oil, rice oil, safflower oil, palm oil, coconut oil, and beef tallow. Fractions of these fats or oils and those having melting points that are modified by hydrogenation, transesterification, etc. are also useful. A mixture of a hardened rapeseed oil and palm oil and a mixture of a hardened soybean oil and palm oil are preferred.

The shortening of the present invention is preferably obtained by esterifying fatty acids derived from any of the aforementioned fats and oils with glycerol to obtain a fat having a high diglyceride content. This fat alone or a mixture thereof with any of the aforementioned starting fats and oils can be used. An antioxidant can be added thereto if desired. The excess monoglycerides yielded by the reaction can be removed by molecular distillation or chromatography. The esterification can be conducted by a chemical reaction using an alkali catalyst, etc. It is preferably conducted enzymatically under mild conditions using, e.g., a lipase having 1,3-position selectivity, because the fat obtained by the enzymatic method is excellent in flavor.

The shortening of the present invention comprises a fat composition containing diglycerides, effective in inhibiting body fat accumulation, in a high concentration. Specifically, the shortening comprises a fat composition having a diglyceride content of from 55 to less than 95% by weight, preferably 65 to less than 95% by weight, and in which 55 to less than 93% by weight of the fatty acid groups contained in the diglycerides are unsaturated fatty acid groups. If the content of unsaturated fatty acid groups contained in the diglycerides is lower than 55% by weight, (based on total fatty acid groups) the shortening has too high a melting point to have satisfactory handlcability. If the content thereof is higher than 93% by weight, deep frying with the shortening gives fried foods which are likely to give off or ooze oil and give an unsatisfactory greasy feeling in the mouth.

The content of unsaturated fatty acid groups contained in the diglycerides is preferably from 55 to less than 80% by weight, because this shortening is not as likely to give off or ooze oil in the fried product. In particular, a preferred combination of fatty acid groups comprises from 0.5 to less than 20% by weight of SS components, from 20 to less than 55% by weight of SU components, and from 25 to less than 70% by weight of UU components, wherein S is a $C_{14-22}$ saturated fatty acid group and U is a $C_{14-22}$ unsaturated fatty acid group. The SS component, SU component, and UU component contents are preferably from 2 to less than 16% by weight, from 25 to less than 50% by weight, and from 30 to less than 65% by weight, respectively, and are more preferably from 4 to less than 12% by weight, from 30 to less than 48% by weight, and from 35 to less than 60% by weight, respectively. If the SS component content exceeds 20% by weight, the shortening has too high a melting point and is too hard to be readily handleable. If the SU component content is lower than 20% by weight, SS component crystals separate out and are likely to cause handleability problems. SU component contents of higher than 55% by weight are undesirable in that the production of such a shortening necessitates fractionation as an essential step and leads to increased cost. If the UU component content is higher than 70% by weight, oil oozing after deep frying is likely to occur.

In the diglycerides contained in the present shortening, the weight ratio of the $C_{14}$ and $C_{16}$ saturated fatty acid groups to the $C_{18}$, $C_{20}$, and $C_{22}$ saturated fatty acid groups is preferably 1.0 to 8.0, more preferably 2.0 to 7.0. Compared to conventional fats comprising mainly triglycerides, the present fat compositions containing diglycerides in a high concentration tend to significantly change in physical properties, depending on the kinds of the fatty acid groups contained therein. If the above ratio is lower than 1.0, the shortening tends to develop dense and fine crystals and is too hard to be readily handleable. If the above ratio exceeds 8.0, the foods deep-fried with the shortening tend to have reduced crispness and give a greasy feeling in the mouth.

Some fats contain a slight amount of natural diglycerides. The content of all diglycerides contained in the present shortening, including those natural diglycerides, is preferably within the range shown above.

In the present invention, the shortening preferably has a smoke point of not lower than an ordinary cooking temperature, for example at 170° C. From the standpoint of attaining satisfactory flavor, the content of monoglycerides contained in the present shortening is preferably 2% by weight or lower, more preferably below 1.5% by weight, still more preferably below 1.3% by weight.

The fried food of the present invention is one containing the fat composition which has been absorbed thereby in the deep frying process. For example, potato chips can contain from 10 to 50% by weight of the present fat composition absorbed in the deep frying process. Fried chicken, french fried potatoes, and doughnuts can contain the fat composition around the surface thereof in a high concentration.

Fried foods obtained using a large amount of the fat composition have a more stable quality than ones obtained with a small amount. Deep frying with a larger amount of the fat can have a reduced oil temperature fluctuation. The amount of the fat used for deep frying is desirably 5 liters or larger, preferably 10 liters or larger.

For inhibiting deterioration of the fried foods, an antioxidant such as a tocopherol, an ascorbic ester and a natural antioxidizing ingredient may also be used. Examples of the ascorbic ester include palmitate and stearate. Examples of the natural antioxidizing ingredient include plant extracts obtained from leaves or roots of tea, and herbs such as rosemary, peach, etc.

Although phospholipids are not usually added to the present shortening, they can be added in such an amount as not to cause thermal discoloration, preferably 100 ppm or less, more preferably 50 ppm or less.

EXAMPLES

Having generally described this invention, a further understanding can be obtained by reference to certain specific examples which are provided herein for purposes of illustration only and are not intended to be limiting unless otherwise specified.

In the Examples, all percents and parts are by weight.

Example 1

Preparation of Diglycerides 3.5 kg of rapeseed oil was mixed with 3.5 kg of distilled water and 5 g of a commercial lipase preparation, "Lipase OF", trade name, manufactured by Meito Sangyo Co. Ltd. The mixture was reacted, while being stirred at 36° C. for 5 hours. Thereafter, the reaction mixture was centrifuged, and fatty acids derived from rapeseed oil were obtained from the upper layer.

The fatty acids obtained above were mixed with glycerol at a molar ratio of about 2/1, and the resultant mixture was reacted at 50° C. at a reduced pressure using as the catalyst a commercial lipase preparation, "Lipozyme 3A", trade name, manufactured by Novo Industri A.S. which is an immobilized lipase having 1,3-position selectivity. After the lipase preparation was filtered off, the obtained product mixture was subjected to molecular distillation and purified in a conventional manner to obtain a diglyceride mixture derived from rapeseed oil and having the following composition:

Triglycerides 12%,
Diglycerides 87%, and
Monoglycerides 1%.

Preparation of Shortening for Frying 0.07% of tocopherol and 0.03% of ascorbic ester were added as antioxidants to each of the diglyceride mixture, rapeseed oil, and four mixtures of the diglyceride mixture with rapeseed oil, which are shown in Table 1. Thus, shortenings A to F were obtained.

TABLE 1

| | Fat Composition (%) | | Content of unsaturated fatty acids in DG (%) | Glyceride composition (%) | | | | Smoke point (° C.) |
|---|---|---|---|---|---|---|---|---|
| | Rapeseed oil | DG | | MG | DG | TG | AV | |
| A | 30 | 70 | 91.4 | 0.8 | 61.6 | 37.6 | 0.05 | 225 |
| B | 20 | 80 | 91.4 | 0.8 | 70.1 | 29.1 | 0.06 | 220 |
| C | — | 100 | 91.4 | 1.0 | 87.0 | 12.0 | 0.09 | 218 |
| D | 50 | 50 | 91.4 | 0.6 | 44.7 | 54.7 | 0.06 | 230 |
| E | 80 | 20 | 91.4 | 0.4 | 19.2 | 80.4 | 0.07 | 235 |
| F | 100 | — | 91.4 | 0.2 | 2.3 | 97.5 | 0.09 | 238 |

Production and Evaluation of Potato Chips

Each of shortenings A to F was introduced in an amount of 10 kg into an electric fryer, SEF-D9A, trade name, manufactured by Sanyo Electric Co., Ltd., and heated to 180° C. A peeled white potato was sliced in a thickness of about 1.5 mm, washed with water to remove the surface starch and soluble components therefrom, and then dried by wiping off the remaining water. The sliced potato was heated for 3 minutes in each of the shortenings heated at 180° C. to produce potato chips. Immediately thereafter, the water content of the potato chips was measured. During heating, each shortening was examined for bubbling. The potato chips were examined for feeling in the mouth and moisture absorption, immediately after production and after storage at 20° C. and 65±5% RH (relative humidity). Flavor evaluation was further conducted after the potato chips had been wrapped with an aluminum foil laminate and stored at a cold dark place for 30 days.

Bubbling During Deep Frying

The shortenings were observed for bubbling in five grades. Those almost free from bubbling were marked at point 5, while rapeseed oil (shortening F) was marked at point 1.

The obtained results are shown in Table 2.

Feeling in the Mouth

The potato chips were evaluated for crispiness in five grades by the sense of ten panelists. Those which gave a remarkable crispness and lightness in the mouth were rated at point 5, while those which gave a rather low crispness and heaviness in the mouth were rated at point 1. The evaluations by the ten panelists were averaged.

The obtained results are shown in Table 3.

Water Content and Moisture Absorption

Water content: Water content was measured with an oil content/water content meter, AVC-80, trade name, manufactured by CEM.

Moisture absorption: The potato chips were weighed at intervals, and the increase in water content (%) was determined from the increase in weight.

The obtained results are shown in Table 4.

Flavor

The potato chips were evaluated for flavor in five grades in a sensory test by ten panelists. Those having neither an odor of deteriorated fats nor offensive odor were marked at point 5. Those deep-fried with rapeseed oil (shortening F) were marked at point 1. The evaluations by the ten testers were averaged.

The obtained results are shown in Table 5.

TABLE 2

Bubbling During Deep Frying

| | Examples | | | Comparative compounds | | |
|---|---|---|---|---|---|---|
| Shortening for frying | A | B | C | D | E | F |
| Bubbling | 3.5 | 3.5 | 4.0 | 2.0 | 1.5 | 1.0 |

TABLE 3

Feeling in the Mouth

| | Examples | | | Comparative compounds | | |
|---|---|---|---|---|---|---|
| Shortening for frying | A | B | C | D | E | F |
| just after production | 4.7 | 4.7 | 4.8 | 4.2 | 3.8 | 3.5 |
| after two days | 4.1 | 4.2 | 4.5 | 3.2 | 3.0 | 2.0 |
| after 5 days | 3.9 | 3.9 | 3.9 | 2.5 | 1.5 | 1.2 |

TABLE 4

Water Content and Moisture Application

| Shortening for frying | | Examples | | | Comparative compounds | | |
|---|---|---|---|---|---|---|---|
| | | A | B | C | D | E | F |
| Water content (%) | just after production | 1.8 | 1.7 | 1.6 | 2.3 | 2.5 | 2.8 |
| Increase in water content (%) | just after production | 0 | 0 | 0 | 0 | 0 | 0 |
| | after 2 days | 1.0 | 0.9 | 0.8 | 1.4 | 1.7 | 2.0 |
| | after 5 days | 1.5 | 1.3 | 1.3 | 2.3 | 2.6 | 2.8 |

TABLE 5

Flavor

| Shortening for frying | Examples | | | Comparative compounds | | |
|---|---|---|---|---|---|---|
| | A | B | C | D | E | F |
| after 30 days | 4.5 | 4.7 | 4.7 | 3.7 | 2.6 | 1.0 |

Example 2

Production of Doughnuts

Each of shortenings C and F was introduced in an amount of 1 kg into a frying pan and heated to 180° C. 30 parts of sugar was mixed with 8 parts of a shortening for kneading, New Econa, trade name, manufactured by Kao Corp., Japan, and 1 part of common salt. The mixture was stirred with a vertical mixer equipped with a beater. The mixture was further stirred until it became creamy while 20 parts of egg and 35 parts of water were gradually added thereto. Thereto were added 80 parts of weak flour, 20 parts of strong flour, and 3 parts of a baking powder. The resultant mixture was stirred for 90 seconds. After the obtained dough was allowed to stand at room temperature for about 20 minutes, it was rolled out to a thickness of about 1 cm. This dough sheet was punched with a cookie cutter for doughnuts having a ring diameter of 75 mm. Four of the dough pieces thus obtained were dropped into the shortening heated at 180° C., and deep-fried therein for several minutes with occasional turning until the surfaces thereof turned gold. The fried dough pieces were picked up with a metal basket and the excess oil drained off. The above operation was repeated twice to fry four dough pieces.

Evaluation and Results

The total amounts of shortenings C and F absorbed were calculated from the weights thereof remaining in the frying pan, and were found to be 119.9 g and 192.9 g, respectively. The doughnuts fried with shortening C gave a better, crispy feeling in the mouth and a less greasy feeling than those fried with shortening F.

Example 3

Production of French Fried Potatoes

Each of shortenings C and F was introduced in an amount of 10 kg into an electric fryer, SEF-D9A, trade name, manufactured by Sanyo Electric Co., Ltd., and heated to 180° C. Unpeeled potatoes were well washed and cut lengthwise into four to six pieces each in a comb shape. These potato pieces were soaked in water for about 15 minutes. After the water remaining on the potato pieces was wiped off, the potato pieces were put into each shortening heated at 180° C., and fried therein for several minutes, while gently stirring, until each piece was wholly cooked and the surface thereof turned gold.

Evaluation and Results

In deep frying, shortening C bubbled less than shortening F. 5 minutes after deep frying, the fried potatoes were examined for appearance, and almost no oil was given off. Within 15 minutes after deep frying, the fried potatoes were evaluated for feeling in the mouth. The potatoes fried with shortening C had surface crispiness and gave a more satisfactory feeling in the mouth and a less greasy feel than those fried with shortening F.

Example 4

Production of Fried Chicken

Each of shortenings C and F was introduced in an amount of 10 kg into an electric fryer, SEF-D9A, trade name, manufactured by Sanyo Electric Co., Ltd., and heated to 170° C. Chicken thigh was cut into pieces slightly bigger than one mouthful, and a small amount of salt, pepper, and lemon juice were added thereto. After they were well mixed, the chicken pieces were covered lightly with flour. The flavored chicken pieces were dropped into each shortening heated at 170° C. and fried for several minutes until they came to the shortening's surface.

Evaluation and Results

In deep frying, shortening C bubbled less than shortening F. 5 minutes after the deep frying, the fried chicken was examined for appearance, and almost no oil was given off. Within 15 minutes after deep frying, the fried chicken was evaluated for feeling in the mouth. The chicken fried with shortening C had crispiness in the coating surface and gave a more satisfactory feeling in the mouth and a less greasy feeling than those fried with shortening F.

Example 5

Preparation of Diglycerides

A hardened rapeseed oil (melting point: 31.5° C.) and palm oil were used as the feedstock in the same manner as in Example 1 to obtain fatty acids. The composition of the fatty acids obtained from each oil is shown in Table 6.

TABLE 6

| | Hardened rapeseed oil % | Palm oil % |
|---|---|---|
| $C_{14:0}$ | — | 1.1 |
| $C_{16:0}$ | 3.8 | 44 |
| $C_{16:1}$ | 0.2 | 0.1 |
| $C_{18:0}$ | 12.0 | 4.5 |
| $C_{18:1}$ | 78.7 | 39.2 |
| $C_{18:2}$ | 0.2 | 10.1 |
| $C_{18:3}$ | — | 0.4 |
| $C_{20:0}$ | — | 0.4 |
| $C_{20:1}$ | 2.3 | — |

The two fatty acid mixtures were mixed with each other in the proportions shown in Table 7, and diglyceride mixtures 1 to 4 were obtained therefrom in the same manner as in Example 1.

TABLE 7

| Diglyceride mixture | Proportion of feedstock fatty acids (%) | | Fat composition (%) | | | Content of unsaturated fatty acids in DG (%) | DG composition (%) | | | Fatty acid ratio in DG $(C_{14} + C_{16})/(C_{18} + C_{20} + C_{22})$ |
|---|---|---|---|---|---|---|---|---|---|---|
| | Fatty acids derived from hardened rapeseed oil | Fatty acids derived from palm oil | MG | DG | TG | | SS | SU | UU | |
| 1 | 100 | 0 | 1.1 | 88.1 | 10.8 | 81.5 | 3.1 | 30.9 | 66.9 | 0.3 |
| 2 | 60 | 40 | 0.9 | 86.8 | 12.3 | 68.8 | 9.9 | 43.2 | 46.9 | 2.2 |
| 3 | 25 | 75 | 1.0 | 85.3 | 13.7 | 57.7 | 18.1 | 48.8 | 33.1 | 5.2 |
| 4 | 0 | 100 | 1.0 | 87.5 | 11.5 | 49.8 | 25.5 | 49.8 | 24.7 | 9.2 |

Preparation of Shortenings for Frying

The diglyceride mixtures 1 to 4 shown in Table 7 were heated, and 0.07% of tocopherol and 0.03% of ascorbic ester were added thereto as antioxidants. The mixtures were cooled to room temperature to obtain shortenings G to J.

Production and Evaluation of Doughnuts

Each of shortenings F to J was introduced in an amount of 10 kg into an electric fryer, SEF-D9A, trade name, manufactured by Sanyo Electric Co., Ltd., and heated to 180° C. Dough pieces were obtained in the same manner as in Example 2. The obtained dough pieces were dropped into each of the shortenings heated at 180° C., and deep-fried therein for several minutes with occasional turning until the surfaces turned gold.

Each shortening was examined for bubbling during deep frying. The obtained doughnuts were allowed to stand at room temperature for 30 minutes after the deep frying, and then examined for appearance and oil oozing on the surface. The doughnuts were further evaluated for feeling in the mouth with respect to surface greasiness.

Bubbling During Deep Frying

The shortenings were evaluated for bubbling in five grades in a sensory test. Those almost free from bubbling were marked at point 5, while rapeseed oil (shortening F) was marked at point 1.

Appearance

The doughnuts were observed for oil oozing in five grades in a sensory test by ten panelists. Those being almost free from oil oozing were marked at point 5, while those fried with shortening F (rapeseed oil) were marked at point 1. The evaluations by the ten panelists were averaged.

Feeling in the Mouth

The doughnuts were evaluated for greasiness in five grades in a sensory test by ten testers. Those being almost free from greasiness were rated at point 5, while those fried with shortening F (rapeseed oil) were marked at point 1. The evaluations by the ten panelists were averaged.

The obtained results are shown in Table 8.

TABLE 8

| Shortening for frying | Comp. compound F | Examples | | | Comp. compound J |
|---|---|---|---|---|---|
| | | G | H | I | |
| Bubbling | 1.0 | 4.0 | 4.0 | 4.0 | 3.5 |
| Appearance | 1.0 | 3.0 | 3.6 | 3.4 | 2.1 |
| Feeling in the mouth | 1.0 | 3.1 | 3.5 | 3.4 | 1.9 |

This application is based on Japanese Priority Application 10-51007, filed in the Japanese Patent Office on Mar. 3, 1998, the entire contents of which are hereby incorporated by reference.

Obviously, additional modifications and variations of the present invention are possible in light of the above teachings. It is therefore to be understood that within the scope of the appended claims, the invention may be practiced otherwise than as specifically described herein.

What is claimed is:

1. A method of making a deep fried food comprising the step of:
   deep frying a food, containing a fat composition containing 55% by weight to less than 95% by weight of diglycerides, in which 55% by weight to less than 93% by weight of the fatty acid groups contained therein are unsaturated fatty acid residues and wherein a weight ratio of $C_{14}$ and $C_{16}$ saturated fatty acid groups contained in the diglycerides to $C_{18}$, $C_{20}$ and $C_{22}$ saturated fatty acid groups contained in the diglycerides is 1.0 to 8.0;
   wherein said food is a doughnut; and wherein said deep frying is carried out in the presence of an antioxidant.

2. The method of claim 1, wherein the deep fried food is a member selected from the group consisting of friedcakes, french fried potatoes, fried chicken and doughnuts.

3. The method of claim 1, wherein the amount of the fat composition is 5 liters or larger.

4. A fat composition comprising:
   a monoglyceride content of 2% by weight or lower, a diglyceride content of 55 to less than 95% by weight, and a triglyceride content of 5 to less than 45% by weight, wherein
   (1) from 55% by weight to less than 80% by weight of the fatty acid groups contained in the diglycerides are unsaturated fatty acid groups,
   (2) the diglycerides comprise 0.5% by weight to less than 20% by weight of SS components, 20% by weight to less than 55% by weight of SU components, and 25% by weight to less than 70% by weight of UU components, wherein S represents a $C_{14\text{-}22}$ saturated fatty acid group and U represents a $C_{14\text{-}22}$ unsaturated fatty acid group, wherein the total of % SS+% SU+% UU=100, and
   (3) a weight ratio of $C_{14}$ and $C_{16}$ saturated fatty acid groups contained in the diglycerides to $C_{18}$, $C_{20}$, and $C_{22}$ saturated fatty acid groups contained in the diglycerides is 1.0 to 8.0.

5. The fat composition as claimed in claim 4, wherein the fatty acid groups contained in the diglycerides are obtained from a feedstock fat or oil selected from the group consisting of vegetable oils, animal fats, oils and fats obtained by hydrogenation and transesterification thereof and mixtures thereof.

6. The fat composition as claimed in claim 5, wherein the feedstock fat or oil is a member selected from the group consisting of rapeseed oil, sunflower oil, corn oil, soybean oil, rice oil, safflower oil, palm oil, coconut oil, beef tallow, hydrogenation and transesterification products thereof and mixtures thereof.

7. The fat composition as claimed in claim 5, wherein the feedstock fat or oil is a member selected from the group consisting of a mixture of a hardened rapeseed oil and palm oil and a mixture of a hardened soybean oil and palm oil.

8. The fat composition as claimed in claim 4, wherein monoglycerides are present in an amount of below 1.5% by weight.

9. The fat composition as claimed in claim 8, wherein monoglycerides are present in an amount of below 1.3% by weight.

10. The fat composition as claimed in claim 4, wherein the weight ratio of $C_{14}$ and $C_{16}$ saturated fatty acid groups contained in the diglycerides to $C_{18}$, $C_{20}$, and $C_{22}$ saturated fatty acid groups contained in the diglycerides is 2.0 to 7.0.

11. The fat composition as claimed in claim 4, wherein the diglycerides comprise 2% by weight to less than 16% by weight of SS components, 25% by weight to less than 50% by weight of SU components, and 30% by weight to less than 65% by weight of UU components.

12. The fat composition as claimed in claim 11, wherein the diglycerides comprise 4% by weight to less than 12% by weight of SS components, 30% by weight to less than 48% by weight of SU components, and 35% by weight to less than 60% by weight of UU components.

13. A fried food containing the fat composition as claimed in claim 4.

14. The fried food as claimed in claim 13, wherein the fried food is selected from the group consisting of friedcakes, french fried potatoes, fried chicken, and doughnuts.

15. A shortening composition, comprising the fat composition as claimed in claim 4.

16. A fat composition comprising:

a monoglyceride content of 2% by weight or lower, a diglyceride content of 55 to less than 95% by weight, and a triglyceride content of 5 to less than 45% by weight, wherein
  (1) from 55% by weight to less than 80% by weight of the fatty acid groups contained in the diglycerides are unsaturated fatty acid groups,
  (2) the diglycerides comprise 0.5% by weight to less than 20% by weight of SS components, 20% by weight to less than 55% by weight of SU components, and 25% by weight to less than 70% by weight of UU components, wherein S represents a $C_{14-22}$ saturated fatty acid group and U represents a $C_{14-22}$ unsaturated fatty acid group, wherein the total of % SS+% SU+% UU=100, and
  (3) a weight ratio of $C_{14}$ and $C_{16}$ saturated fatty acid groups contained in the diglycerides of $C_{18}$, $C_{20}$, and $C_{22}$ saturated fatty acid groups contained in the diglycerides is 1.0 to 8.0, further comprising up to 100 ppm of phospholipids.

* * * * *